US011934134B1

(12) United States Patent
Kurita

(10) Patent No.: US 11,934,134 B1
(45) Date of Patent: Mar. 19, 2024

(54) IMAGE FORMING APPARATUS

(71) Applicant: TOSHIBA TEC KABUSHIKI KAISHA, Tokyo (JP)

(72) Inventor: Suguru Kurita, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/944,104

(22) Filed: Sep. 13, 2022

(51) Int. Cl.
*G03G 15/00* (2006.01)

(52) U.S. Cl.
CPC ..... *G03G 15/5058* (2013.01); *G03G 15/5041* (2013.01); *G03G 2215/00042* (2013.01)

(58) Field of Classification Search
CPC .................................................. G03G 15/5058
USPC ............................................................. 73/49
See application file for complete search history.

(56) References Cited

U.S. PATENT DOCUMENTS 5,351,107 A * 9/1994 Nakane ................ H04N 1/4076 347/132
5,461,462 A 10/1995 Nakane et al.
2012/0075659 A1* 3/2012 Sawada .................. G03G 15/55 358/1.14
2017/0038716 A1* 2/2017 Itagaki .................. G03G 15/55

FOREIGN PATENT DOCUMENTS

JP H0414060 A 1/1992
JP 2003015377 A 1/2003
JP 2005265956 A 9/2005

* cited by examiner

*Primary Examiner* — Walter L Lindsay, Jr.
*Assistant Examiner* — Philip T Fadul
(74) *Attorney, Agent, or Firm* — Kim & Stewart LLP

(57) ABSTRACT

According to one embodiment, an image forming apparatus includes an image forming unit to form an image on a sheet and a sensor with a light emitting part having a light emission intensity that changes according to an input voltage level and a light receiving part that outputs an output value that changes according to the amount of incident light. The sensor is configured to detect a toner density of the image formed by the image forming unit. A power supply unit is provided to supply power to the light emitting part and change the input voltage level of the power supplied to light emitting part in a predetermined sequence until an end condition is satisfied during an inspection operation. A controller is configured to make an abnormality determination based on a state of the sensor when the end condition is satisfied during the inspection operation.

20 Claims, 12 Drawing Sheets

| SEARCH COUNT | INPUT VOLTAGE (SET VALUE) | OUTPUT VALUE |
|---|---|---|
| 1 | 128 | 5. 20 |
| 2 | 64 | 2. 80 |
| 3 | 96 | 5. 20 |
| 4 | 80 | 4. 14 |
| 5 | 72 | 3. 47 |
| 6 | 76 | 3. 81 |
| 7 | 78 | 3. 90 |
| 8 | 79 | 2. 00 |

FIG. 9

| SEARCH COUNT | INPUT VOLTAGE (SET VALUE) | OUTPUT VALUE |
|---|---|---|
| 1 | 128 | 2. 00 |
| 2 | 192 | 5. 20 |
| 3 | 160 | 5. 20 |
| 4 | 144 | 5. 20 |
| 5 | 136 | 5. 20 |
| 6 | 132 | 5. 20 |
| 7 | 130 | 5. 20 |
| 8 | 129 | 5. 20 |

IMAGE FORMING APPARATUS

FIELD

Embodiments described herein relate generally to an image forming apparatus.

BACKGROUND

An image forming apparatus can be used in an office environment or a remote work environment.

In an image forming apparatus, image quality may change according to a change in operating conditions. Therefore, image quality maintenance control may be periodically performed to maintain the required image quality. In this image quality maintenance control, a test pattern may be printed then evaluated, and various parameters related to image formation may be adjusted to maintain the required image quality.

Therefore, if the test pattern cannot be evaluated correctly, proper image quality maintenance control cannot be performed. Accordingly, it is preferable that any device error, state, or condition that might prevent proper test pattern evaluation not be left uncorrected for very long.

BRIEF DESCRIPTION OF THE DRAWINGS

FIG. 9 is a table illustrating the result of a search operation if a scratch on a belt reaches a detection position of a target sensor when a search count value is one.

DETAILED DESCRIPTION

In general, according to one embodiment, an image forming apparatus includes an image forming unit to form an image on a sheet and a sensor with a light emitting part having a light emission intensity that changes according to an input voltage level and a light receiving part that outputs an output value that changes according to the amount of incident light. The sensor is configured to detect a toner density of the image formed by the image forming unit. A power supply unit is provided to supply power to the light emitting part and change the input voltage level of the power supplied to light emitting part in a predetermined sequence until an end condition is satisfied during an inspection operation. A controller is configured to make an abnormality determination based on a state of the sensor when the end condition is satisfied during the inspection operation.

Hereinafter, certain example embodiments will be described with reference to the drawings. In the following examples, a multi-function peripheral (MFP) incorporating an image forming apparatus as a printer will be described as one, non-limiting example.

First Embodiment

Figure 1:
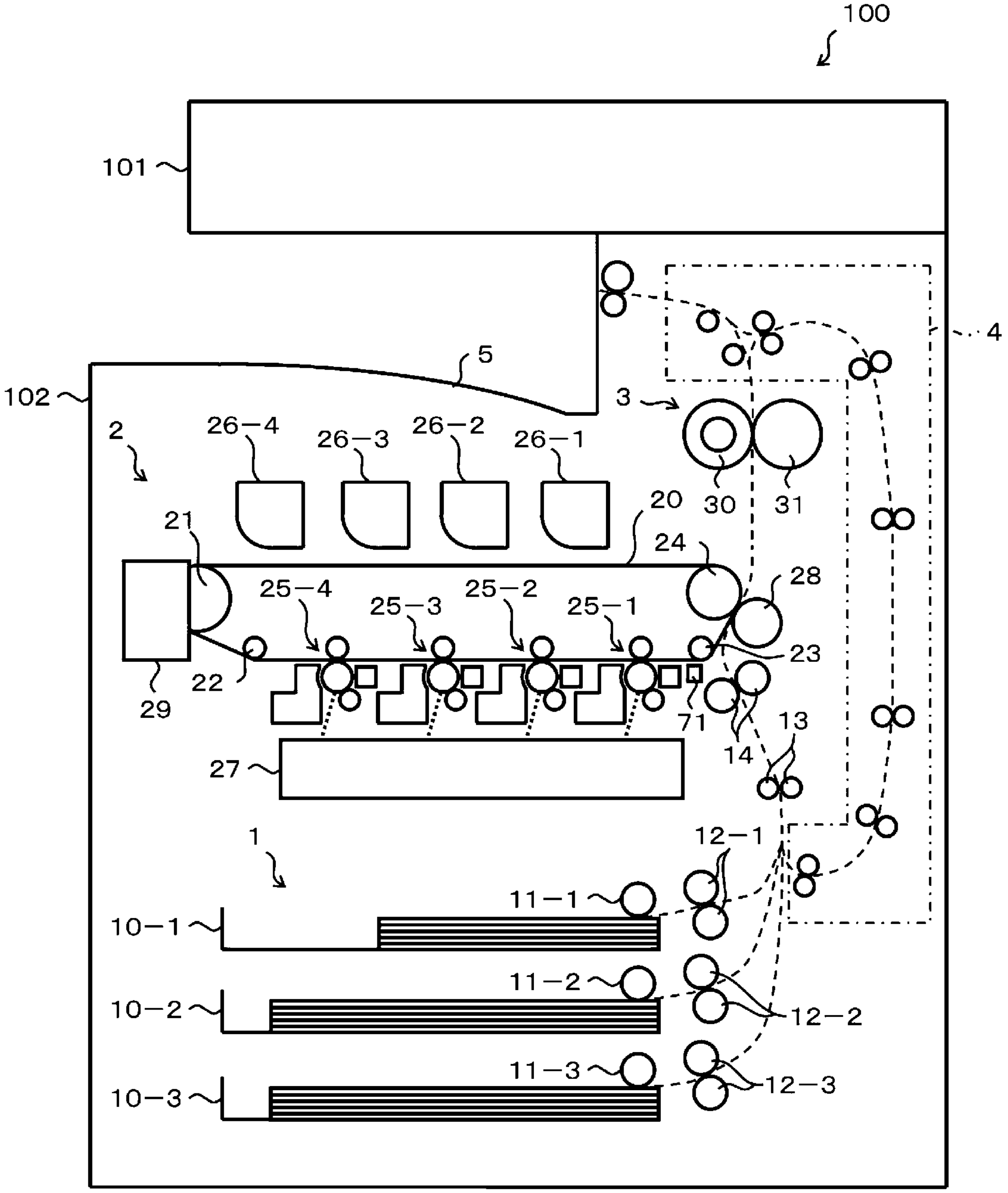
FIG. 1 illustrates a mechanical configuration of an MFP according to a first embodiment.

FIG. 1 is a diagram illustrating an example configuration of an MFP 100 according to a first embodiment. As illustrated in FIG. 1, the MFP 100 includes a scanner 101 and a printer 102.

The scanner 101 reads a document and generates image data corresponding to the document that has been read. The scanner 101 includes an image sensor such as a line sensor using a charge-coupled device (CCD). The scanner 101 uses the image sensor to generate image data according to reflected light image from a surface of the document. The scanner 101 scans the document on a document platen by using the image sensor that moves along the document. The scanner 101 may also scan a document that is conveyed by an auto document feeder (ADF) past a fixed image sensor.

The printer 102 forms an image on a medium (e.g., a sheet of paper) by an electrophotographic method. The medium is typically printer paper such as paper sheets of a standard size and type. In other examples, the medium on which an image is formed may be label paper incorporating an adhesive-backed label portion and a waxed or resin label mounting portion. In still other examples, the paper may be provided from a roll or the like rather than as pre-cut sheets. In general, the medium type is not limited and any material upon which an image can be formed by the printer 102 can be adopted. The printer 102 in this example has a color printing function for printing a color image on printer paper and a monochrome printing function for printing a monochrome image (e.g., black and white) on the printer paper. The printer 102 forms a color image by superimposing element images obtained by respectively using, for example, three different colors of toner of yellow, magenta, and cyan, or four different colors of toner obtained by adding black to the three previously mentioned colors. The printer 102 forms a monochrome image using, for example, black toner. In some examples, the printer 102 may include only one of the color printing function or the monochrome printing function.

In the example illustrated in FIG. 1, the printer 102 includes a paper feed unit 1, a print engine 2, a fixing unit 3, an automatic duplexing unit (ADU) 4, and a paper discharge tray 5.

The paper feed unit 1 includes paper feed cassettes 10-1, 10-2, and 10-3, pickup rollers 11-1, 11-2, and 11-3, conveyance roller pairs 12-1, 12-2, and 12-3, a conveyance roller pair 13, and a registration roller pair 14.

In the paper feed cassettes 10-1 to 10-3, printer paper is stored in a stacked state. The printer paper stored in each of the paper feed cassettes 10-1 to 10-3 may be different types of printer paper having different sizes or composition, or may be the same types of printer paper. The paper feed unit 1 may also include a manual feed tray.

The pickup rollers 11-1 to 11-3 take out sheets of printer paper one by one from the paper feed cassettes 10-1 to 10-3, respectively. The pickup rollers 11-1 to 11-3 feed the printer paper to the conveyance roller pairs 12-1 to 12-3.

The conveyance roller pairs 12-1 to 12-3 feed the printer paper fed from the pickup rollers 11-1 to 11-3 to the conveyance roller pair 13 via a conveyance path formed by a guide member.

The conveyance roller pair 13 further conveys the printer paper fed from any of the conveyance rollers 12-1 to 12-3 to the registration roller 14.

The registration roller pair 14 corrects any misalignment or inclination of the printer paper. The registration roller 14 also adjusts the timing for feeding of the printer paper to the print engine 2.

The paper feed cassettes, pickup rollers, and conveyance rollers are not limited to just the three depicted sets, and any number may be provided. If a manual feed tray is provided, then a corresponding pickup roller and conveyance roller pair may be provided for the manual feed tray.

The print engine 2 includes a belt 20, support rollers 21, 22, 23, and 24, image forming units 25-1, 25-2, 25-3, and 25-4, supply units 26-1, 26-2, 26-3, and 26-4, an exposure unit 27, a transfer roller 28, and a belt cleaner 29.

The belt 20 is formed as an endless loop and is supported by the support rollers 21, 22, 23, and 24 so as to maintain the state illustrated in FIG. 1. The belt 20 rotates counterclockwise in FIG. 1 as the support roller 21 rotates. The belt 20 carries a toner image corresponding to the image to be formed on the printer paper on an outer surface thereof (hereinafter referred to as an image carrying surface of the belt 20). The belt 20 is one example of an image carrier. For the belt 20, a semi-conductive polyimide can be used since such material provides good heat resistance and abrasion resistance. The movement of the image carrying surface accompanying the rotation of the belt 20 provides movement in a so-called scanning direction by which an image can be formed line-by-line on the belt 20 (the direction along each image line thus formed is referred to as a scanning direction).

Each of the image forming units 25-1 to 25-4 includes a photoconductor, a charger, a developing device, a transfer device, and a cleaner, and performs image formation by an electrophotographic method in cooperation with the exposure unit 27. The transfer device need not be included within the image forming units 25-1 to 25-4, and may instead be separately included in or as another unit positioned along the belt 20. The image forming units 25-1 to 25-4 are arranged along the belt 20 parallel to each other. The image forming units 25-1 to 25-4 differ only in the color of toner used, and have the same overall structure and operation. The image forming unit 25-1 forms, for example, an element image of black. The image forming unit 25-2 forms, for example, an element image of cyan. The image forming unit 25-3 forms, for example, an element image of magenta. The image forming unit 25-4 forms, for example, an element image of yellow. The image forming units 25-1 to 25-4 superimpose the element images of respective colors on the image carrying surface of the belt 20. With this configuration, the image forming units 25-1 to 25-4 form a full color image in which each element image is superimposed on the image carrying surface of the belt 20 after passing through the image forming unit 25-1.

Toner supplying cartridges or the like containing toner can be attached to the supply units 26-1, 26-2, 26-3, and 26-4, which supply the toner to the image forming units 25-1 to 25-4, respectively. In general, such toner supplying cartridges are replaceable/consumable components of the MFP 100. Such toner supplying cartridges may contain the toner alone, that is, as a so-called one-component developer, or may contain the toner as part of a so-called multi-component developer in which the toner is mixed with another substance such as a carrier. If the toner is part of a multi-component developer, the supply units 26-1, 26-2, 26-3, and 26-4 supply the toner together the carrier or the like. Details related to the passage or connection through which toner is supplied from the supply units 26-1 to 26-4 to the image forming units 25-1 to 25-4 are omitted in FIG. 1.

The exposure unit 27 exposes the respective photoconductors of the image forming units 25-1 to 25-4 according to image data representing the element images of respective colors. As the exposure unit 27, a scanning laser, a light emitting diode (LED) head, or the like may be used. The exposure unit 27 includes, for example, a semiconductor laser element, a polygonal mirror, an imaging lens system and a mirror when a scanning laser is used. In such a case, the exposure unit 27 makes the laser beam, which is emitted from a semiconductor laser element be selectively incident onto the respective photoconductors of the image forming units 25-1 to 25-4 according to positioning of the mirror and timing of laser beam emission, for example. In the exposure unit 27, the polygonal mirror deflects the laser beam for scanning in the axial direction of the photoconductor (depth direction in FIG. 1). The scanning of the laser beam occurs in the so-called main scanning direction.

The transfer roller 28 is disposed in parallel with the support roller 24, and sandwiches the belt 20 therebetween. The transfer roller 28 nips the printer paper fed from the registration roller 14 between the transfer roller 28 and the image carrying surface of the belt 20. The transfer roller 28 transfers a toner image formed on the image carrying surface of the belt 20 to the printer paper by using electrostatic force.

The belt cleaner 29 removes the toner remaining on the image carrying surface of the belt 20 without being completely transferred to the printer paper.

Thus, the print engine 2 forms an image on the printer paper fed by the registration roller 14 using an electrophotographic method. That is, the print engine 2 is one example of a forming unit that forms an image on the printer paper.

The fixing unit 3 includes a fixing roller 30 and a press roller 31.

The fixing roller 30 houses a heater inside thereof, for example, a heat-resistant metal roller. The heater is, for example, an induction heating (IH) heater, but any other type of heater may be used as appropriate. The fixing roller 30 fixes toner on printer paper by melting the toner adhering to the printer paper sent out from the print engine 2.

The press roller 31 is provided in parallel with the fixing roller 30 and presses against the fixing roller 30. The press roller 31 nips the printer paper sent out from the print engine 2 between itself and the fixing roller 30. The press roller 31 serves to press the printer paper against the fixing roller 30 for the toner fixing process.

The ADU 4 includes a plurality of rollers and performs the following two operations as necessary. In the first operation, the printer paper passing through the fixing unit 3 is sent toward the paper discharge tray 5 for discharge after printing. This first operation is performed in single-sided printing or after a double-sided printing is completed. In the second operation, the printer paper passing through the fixing unit 3 is initially conveyed toward the paper discharge tray 5, but then the sheet is switched back and fed for return to the print engine 2 via the sheet return pathway in the ADU 4. This second operation is performed in double-sided printing if only the first side printing has been completed. After the second side printing is completed in a double-sided printing, the double-sided printed sheet is discharged from the ADU 4.

The paper discharge tray 5 receives the printer paper on which the image(s) has been formed when such sheets are ejected.

Figure 2:
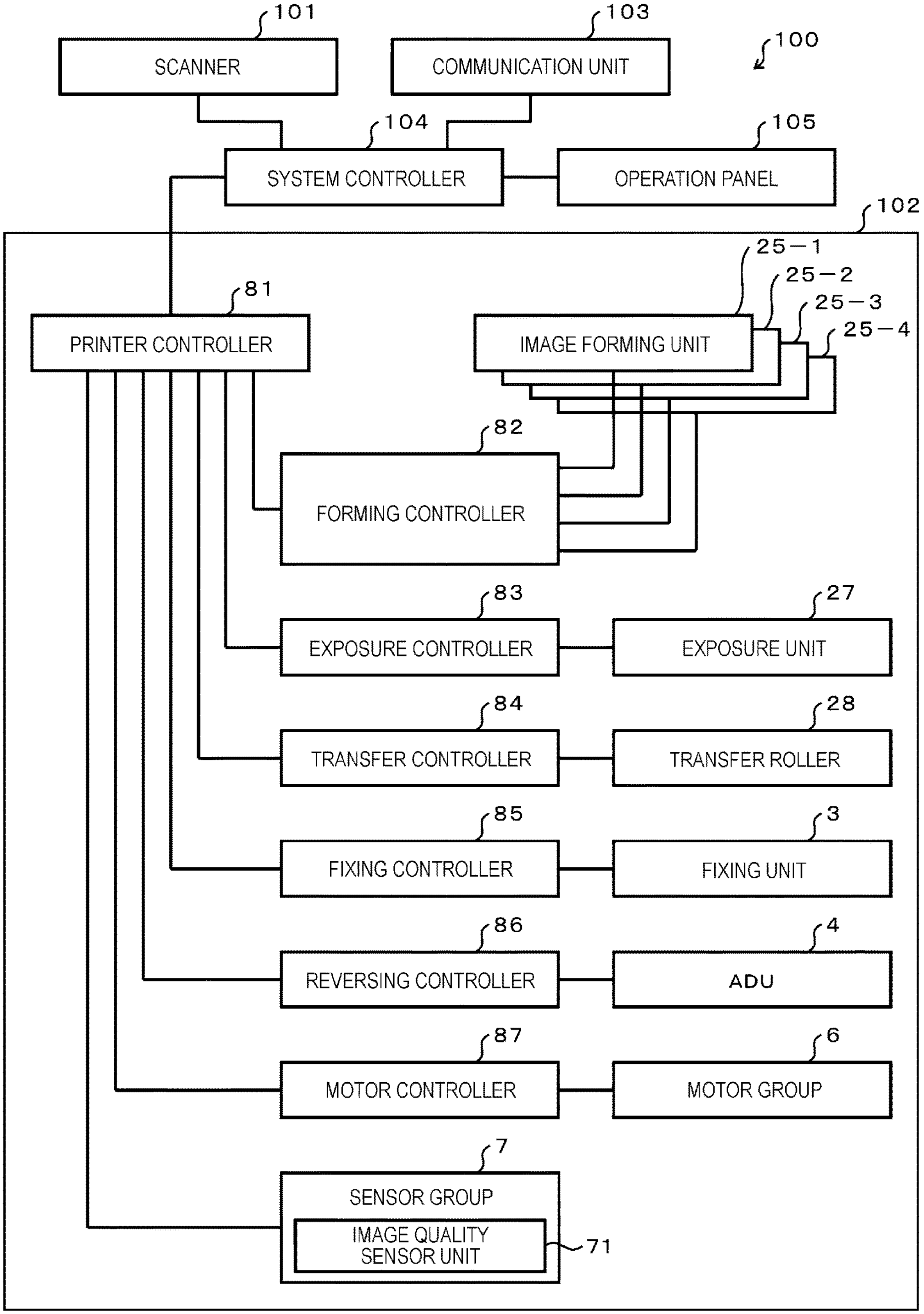
FIG. 2 is a block diagram schematically illustrating a configuration related to control of an MFP.

FIG. 2 is a block diagram schematically illustrating a configuration related to the control of the MFP 100.

The MFP 100 includes a communication unit 103, a system controller 104, and an operation panel 105 in addition to the scanner 101 and the printer 102.

The communication unit 103 performs processing for communicating via a communication network such as a local area network (LAN) and/or a public communication network.

The system controller 104 controls each unit configuring the MFP 100 in order to realize a desired operation of the MFP 100.

The operation panel 105 includes an input device and a display device. The operation panel 105 receives an instruction from an operator or user. The operation panel 105 displays various information to operator. As the operation panel 105, for example, a touch panel, various switches, buttons, keys, lights, lamps, and the like can be used alone or in combination as appropriate.

The fixing unit 3, the ADU 4, the image forming unit 25-1 to 25-4, the exposure unit 27, and the transfer roller 28 included in the printer 102 are components to be controlled by the system controller 104. In addition to these components, the printer 102 includes a motor group 6 as a component to be controlled. The motor group 6 includes a plurality of motors for rotating various components such as the pickup rollers 11-1 to 11-3, the conveyance roller pairs 12-1 to 12-3, the conveyance roller pair 13, the registration roller pair 14, the support roller 21, the transfer roller 28, the fixing roller 30, components in the image forming units 25-1 to 25-4, and the rollers or the like included in the ADU 4.

The printer 102 further includes a sensor group 7, a printer controller 81, a forming controller 82, an exposure controller 83, a transfer controller 84, a fixing controller 85, a reversing controller 86, and a motor controller 87.

The sensor group 7 includes various sensors for monitoring an operating state. The sensor group 7 particularly includes an image quality sensor unit 71 and a jam sensor unit 72.

As illustrated in FIG. 1, the image quality sensor unit 71 is disposed so as to face a region of the image carrying surface of the belt 20 between the image forming unit 25-1 and the transfer roller 28. The image quality sensor unit 71 includes a plurality of sensors for measuring the density and position of the image formed on the image carrying surface of the belt 20.

The jam sensor unit 72 detects the occurrence of jam of the printer paper along the path(s) from the paper feed cassettes 10-1, 10-2, and 10-3 to the paper discharge tray 5. The jam sensor unit 72 includes at least one paper sensor that detects the presence of printer paper at a point along a conveyance path of the printer paper. The jam sensor unit 72 typically includes a plurality of such paper sensors. The jam sensor unit 72 may include paper sensors respectively provided at different positions along the conveyance path(s) of the printer paper.

Figure 3:
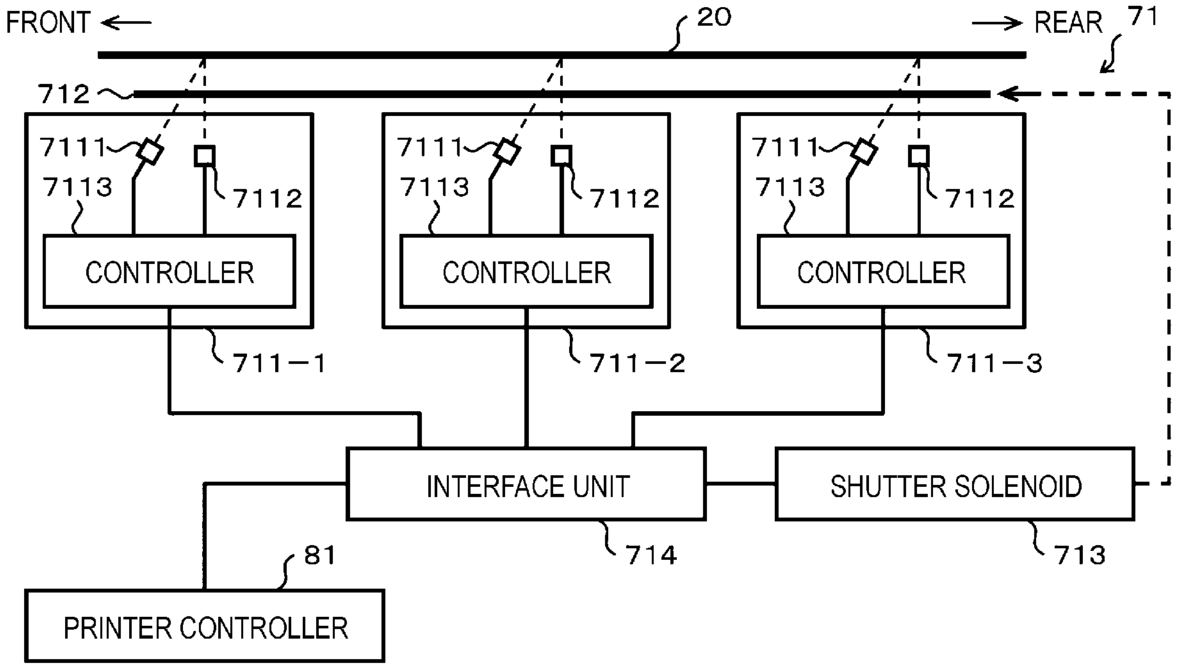
FIG. 3 is a diagram illustrating a configuration example of an image quality sensor unit.

FIG. 3 is a diagram illustrating a configuration example of the image quality sensor unit 71. In the example illustrated in FIG. 3, the image quality sensor unit 71 includes reflective optical sensors 711-1, 711-2, and 711-3, a shutter 712, a shutter solenoid 713, and an interface unit 714.

The optical sensors 711-1 to 711-3 are disposed side by side along the main scanning direction so as to face the image carrying surface of the belt 20 at three positions of the belt 20. The three positions are referred to in this context as the front, center, and rear positions in reference to the positioning within the MFP 100. That is, the belt 20 illustrated in FIG. 2 represents a cross section of FIG. 1 viewed from the right side of FIG. 1. All of the optical sensors 711-1 to 711-3 have the same configuration, and each includes a light emitting part 7111, a light receiving part 7112, and a controller 7113.

The light emitting part 7111 emits light for irradiating the image carrying surface of the belt 20. The light emitting part 7111 emits light with higher intensity as its input voltage increases. (The input voltage in this context, is the voltage supplied to the light emitting part 7111 for purposes of causing the light emitting part to emit light.) The light receiving part 7112 receives reflected light from the image carrying surface of the belt 20 and outputs an electric signal with an output value corresponding to the received amount of the reflected light. The light receiving part 7112 outputs a larger output value as the amount of incident light thereon increases. The controller 7113 outputs the voltage (the input voltage) for driving the light emitting part 7111. The controller 7113 changes the voltage supplied to the light emitting part 7111 under the control of the printer controller 81. The controller 7113 outputs the output value from the light receiving part 7112 to the interface unit 714 so as to send the value to the printer controller 81.

The shutter 712 is a light-shielding thin plate. The shutter 712 is positioned between the belt 20 and the optical sensors 711-1 to 711-3 and is substantially parallel to the belt 20. The shutter 712 is supported by a support mechanism so as to be movable between open and closed positions which are separated from each other along the moving direction of the image carrying surface of the belt 20. When the shutter 712 is in the closed position, the shutter 712 prevents the reflected light from the belt 20 from entering the light receiving part 7112. When the shutter 712 is in the open position, the shutter 712 does not prevent the reflected light from the belt 20 from entering the light receiving part 7112.

The shutter solenoid 713 generates power to move the shutter 712 between the open position and the closed position under the control of the printer controller 81.

The interface unit 714 mediates communication between the printer controller 81 and the controllers 7113 as well as the printer controller 81 and the shutter solenoid 713.

The printer controller 81 controls each unit of the printer 102 under the control of the system controller 104.

All of the forming controller 82, the exposure controller 83, the transfer controller 84, the fixing controller 85, the reversing controller 86, and the motor controller 87 operate under the control of the printer controller 81, and control the operations of the image forming units 25-1 to 25-4, the exposure unit 27, the transfer roller 28, the ADU 4, and the motor group 6, respectively.

Figure 4:
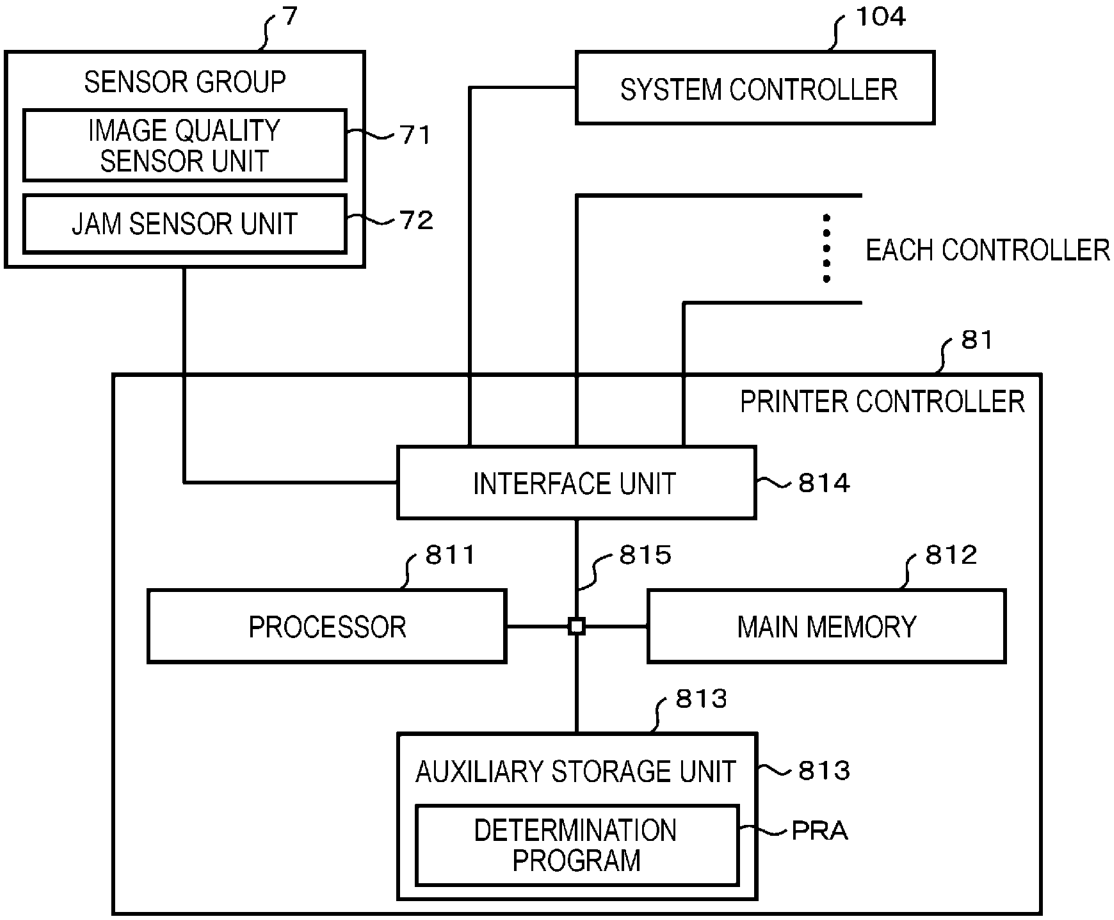
FIG. 4 is a block diagram of a printer controller according to a first embodiment.

FIG. 4 is a block diagram of the printer controller 81.

The printer controller 81 includes a processor 811, a main memory 812, an auxiliary storage unit 813, an interface unit 814, and a transmission path 815.

The processor 811, the main memory 812, and the auxiliary storage unit 813 are connected via the transmission path 815.

The processor 811 executes information processing according to an information processing program such as an operating system, middleware, and an application program or combinations thereof.

The main memory 812 includes a read-only memory area and a rewritable memory area. The main memory 812 stores a part of the information processing program in the read-only memory area. The main memory 812 may store data necessary for the processor 811 to execute processing for controlling each unit in the read-only memory area or the rewritable memory area. The main memory 812 uses the rewritable memory area as a work area by the processor 811.

As the auxiliary storage unit 813, storage devices such as an electric erasable programmable read-only memory (EEPROM), a hard disk drive (HDD), and a solid-state drive (SSD) can be used alone or in combination of two or more thereof. The auxiliary storage unit 813 stores data used by the processor 811 for performing various kinds of processing and data generated by the processing by the processor 811. The auxiliary storage unit 813 may store an information processing program. In this first embodiment, the auxiliary storage unit 813 stores a determination program PRA. The determination program PRA is an information processing program with instructions for determining of whether an abnormality related to the inspection using the image quality sensor unit 71 is present.

The interface unit 814 mediates sending and receiving data to and from the sensor group 7, the system controller 104, the forming controller 82, the exposure controller 83, the transfer controller 84, the fixing controller 85, the reversing controller 86, and the motor controller 87.

Next, an operation of the MFP 100 will be described as a non-limiting example. The changing of the order of some described actions and processing, the omitting of some described actions and processing and/or adding of other actions and processing are possible in other examples.

In the following, description will be made mainly of aspects that are different from conventional MFPs of the same type.

First, an overview of an adjustment operation will be briefly described.

The density and gradation reproducibility of the element images formed by the image forming units 25-1 to 25-4, vary depending on, for example, changes in a development contrast potential, an exposure amount, and a ratio of a screen in processing image data, and the like. The density and gradation reproducibility of the element images formed by the image forming units 25-1 to 25-4 also vary depending on the influence of conditions during image formation, for example, a surrounding environment condition, a degree of deterioration of the photoconductor and the belt 20, and the like. Likewise, a relative positional relationship between the element images respectively formed by each of the image forming units 25-1 to 25-4 may vary over time or with usage. Image quality of the image formed by the printer 102 varies due to the influence of such changes. An operation for compensating for such variations in image quality to maintain some predetermined level of image quality is called an adjustment operation for maintaining image quality.

More specifically, in this context, the adjustment operation is an operation involving the measuring of a test pattern formed on the image-carrying surface of the belt 20 by using the image quality sensor unit 71, and then adjusting operating conditions (parameters) of the respective image forming units 25-1 to 25-4 accordingly.

The processor 811 in the printer controller 81 starts execution of the determination process based on the determination program PRA when a predetermined execution timing is reached. An execution condition may be, for example, when the number of printed sheets after a previous determination process reaches a specified number of sheets, such as 2,000 sheets or the like. Alternatively, the execution timing is, for example, whenever a difference between the temperature and humidity at the time of the previous execution of the determination process and the current temperature and humidity is some predetermined value or more. In general, the execution timing may be appropriately selected by, for example, a designer or a usage manager of the MFP 100. Additionally, a user/operator may instruct the execution of the determination process.

Figure 5:
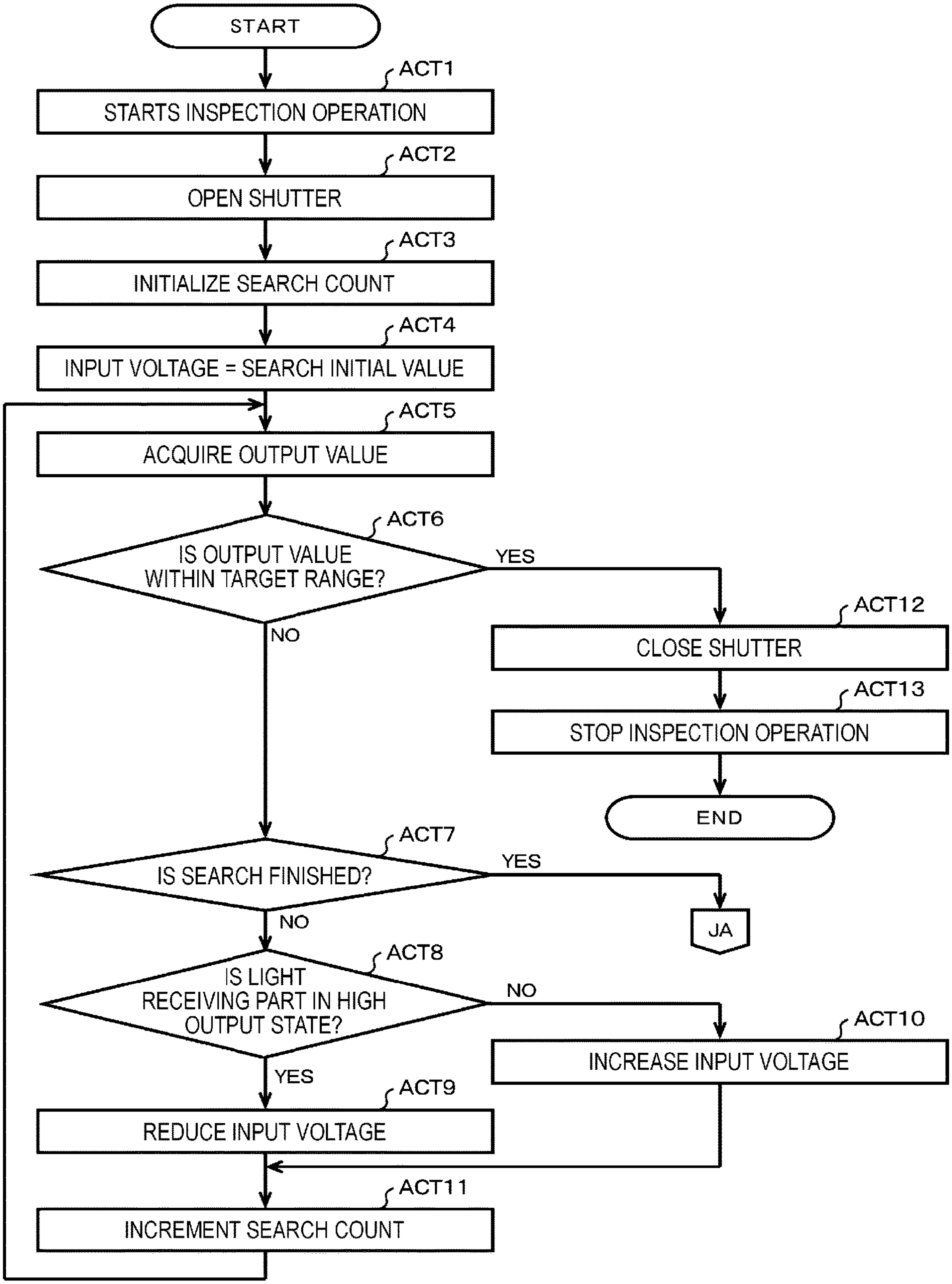
FIG. 5 is a flowchart illustrating a determination process in a first embodiment.
Figure 6:
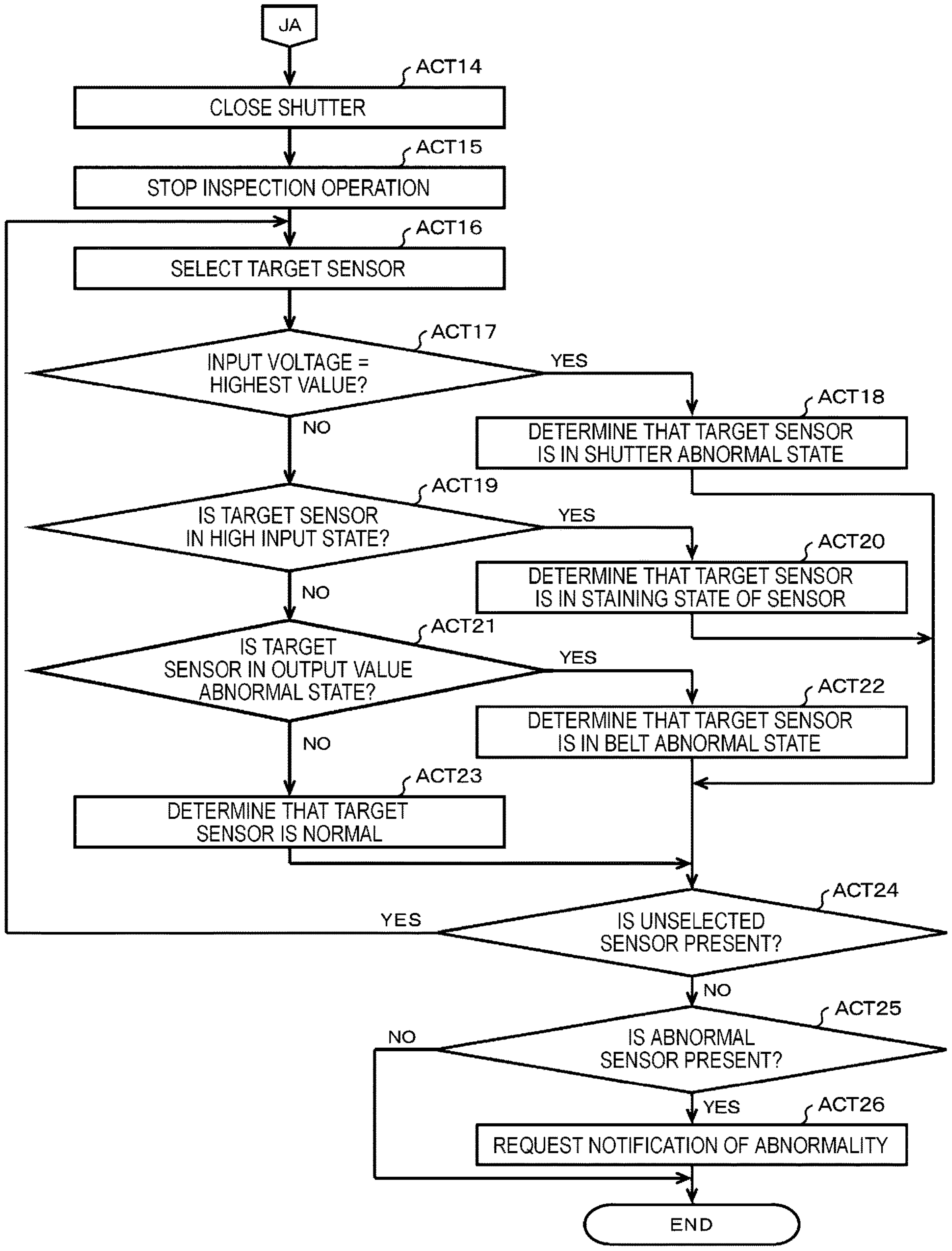
FIG. 6 is a flowchart illustrating additional aspects of a determination process in a first embodiment.

FIG. 5 and FIG. 6 are flowcharts illustrating processing procedures of the processor 811 in the determination process.

As ACT 1 in FIG. 5, the processor 811 starts an inspection operation. The inspection operation includes an inspection with the image quality sensor unit 71 in the determination process. For example, the processor 811 causes the belt 20 to rotate in the inspection operation. For example, in the inspection operation, the processor 811 causes the image forming units 25-1 to 25-4 to be set in a state in which no toner is supplied/adhered to the belt 20. For example, in the inspection operation, the processor 811 causes the belt cleaner 29 to be operated. For example, in the inspection operation, the processor 811 does not cause the printer paper to be fed between the belt 20 and the transfer roller 28. That is, the inspection operation is an operation in which the belt 20 passes the respective detection positions of the optical sensors 711-1 to 711-3 while the belt 20 rotates without any toner being adhered to the image carrying surface of the belt 20. In a normal state, the image carrying surface of the belt 20 reflects more light when the toner is not adhered than if the toner is adhered.

As ACT 2, the processor 811 causes the shutter 712 to be opened. For example, the processor 811 causes the shutter solenoid 713 to be operated so as to move the shutter 712 from the closed position to the open position.

As ACT 3, the processor 811 initializes a search count. For example, the processor 811 manages the search count as a value of a variable N. The processor 811 initializes the search count by setting a predetermined initial value as the value of the variable N. In this embodiment, the initial value is “1”. For example, the initial value may be appropriately determined by the designer of the MFP 100.

As ACT 4, the processor 811 sets the input voltage of each of the light emitting parts 7111 of the optical sensors 711-1 to 711-3 to a predetermined search initial value. For example, the initial search value is appropriately selected by the designer of the MFP 100, and, in general, can be any voltage within the acceptable range for the light emitting part(s) 7111. For example, the processor 811 sends an instruction command for setting the input voltage as the search initial value to the respective controllers 7113 of the optical sensors 711-1 to 711-3 via the interface unit 714. In response to this instruction command, the controller 7113 supplies a voltage corresponding to the initial search value to the light emitting part 7111.

In this first embodiment, a median value of the acceptable input voltage range of the light emitting part 7111 is used. In this embodiment, the input voltage of the light emitting part 7111 can be controlled in 256 stages (increments) between a minimum value and a maximum value. In this embodiment, the printer controller 81 notifies the controller 7113 of magnitude of the input voltage by use of a set value represented as an integer between “1” and “256”. In this embodiment, the set value of “128” is set as the search initial value. Thus, in ACT 4, the processor 811 sends an instruction command for setting the input voltage of the light emitting part 7111 to the voltage corresponding to the set value "128" to the respective controllers 7113 of the optical sensors 711-1 to 711-3.

In the processing after ACT 4, the processor 811 sets each of the optical sensors 711-1 to 711-3 as a target of processing as in ACT 4. That is, each of the optical sensors 711-1 to 711-3 are separately controllable. However, in the following, for the sake of simplification of the explanation, since it is generally not necessary to distinguish between the processing related to the respective optical sensors 711-1 to 711-3, only the processing related to one of the optical sensors 711-1 to 711-3 will be described as representative of each separately.

As ACT 5, the processor 811 acquires the output value from the light receiving part 7112. The processor 811 stores the acquired output value in the main memory 812 or the auxiliary storage unit 813. The processor 811 causes the light emitting part 7111 to emit light in synchronization with the acquisition of the output value from the light receiving part 7112 here. However, the processor 811 may keep the light emitting part 7111 in a light emitting state during all of the inspection operation.

As ACT 6, the processor 811 checks whether or not the output value acquired in ACT 5 is within a predetermined target range. The target range can be appropriately set by the designer of the MFP 100, as corresponding to the expected output values obtained from the light receiving part 7112 when the optical sensors 711-1 to 711-3 are in a normal (non-error) state. If at least one of the output values of the light receiving parts 7112 of the optical sensors 711-1 to 711-3 is not within the target range, the processor 811 determines that the determination result in ACT 6 is NO and proceeds to ACT 7.

As ACT 7, the processor 811 checks whether or not the search for an input value which provides an output value from the light receiving part 7112 within the target range is completed. For example, the processor 811 compares a search count with a predetermined upper limit value. While the search count remains less than the upper limit, the processor 811 determines that the search is not completed (the determination result is NO) and proceeds to ACT 8.

As ACT 8, the processor 811 checks whether or not the light receiving part 7112 is in a high output state. In this context, the high output state corresponds to an upper limit output value for the light receiving part 7112. For example, if the output value acquired in ACT 5 is equal to or greater than the upper limit of the target range, the processor 811 determines that the light receiving part 7112 is in the high output state and the determination result in ACT 8 is YES, and proceeds to ACT 9. In general, the designer of the MFP 100 may appropriately select a setting for the high output state. For example, the high output state may correspond to an output value at the upper target range value, a sensor saturation level, or the like.

As ACT 9, the processor 811 causes the input voltage for the light emitting part 7111 to be reduced. The rules for setting the reduced input voltage here may be appropriately determined by, for example, the designer of the MFP 100. In this embodiment, if the current input voltage set value is represented by V and the search count is represented by N, then the value of $(V-2^{(7-N)})$ is used as the set value of the reduced input voltage. That is, if the processor 811 proceeds to ACT 9 in a state where the set value is "128" and the search count is "1", then "64" is set as the reduced set value.

On the other hand, if the processor 811 cannot check whether or not the high output state is present due to circumstances such as if the output value acquired in ACT 5 is not equal to or greater than the upper limit of the target range, the processor 811 determines that the determination result in ACT 8 is NO and proceeds to ACT 10. Since the corresponding output value is not within the target range, the corresponding output value must be less than the lower limit of the target range, so the processor 811 proceeds to ACT 10.

As ACT 10, the processor 811 increases the input voltage of the light emitting part 7111. The rule for determining the increased input voltage here may be appropriately determined by, for example, the designer of the MFP 100. In this embodiment, a value obtained as $(V+2^{(7-N)})$ is used as the set value of the increased input voltage. That is, if the processor 811 proceeds to ACT 10 in a state where the input voltage set value is "128" and the search count is "1", "192" is set as the increased set value.

For the respective optical sensors 711-1 to 711-3, the output values acquired in the ACT 5 may differ from each other. Therefore, processing of ACT 8 to ACT 10 may be performed separately for each of the optical sensors 711-1 to 711-3. If the output value of one or two of the optical sensors 711-1 to 711-3 is within the target range, the processor 811 does not change the input voltage for the corresponding optical sensor and just those still outside the target range.

If the input voltage is changed in ACT 9 or ACT 10, the processor 811 ultimately proceeds to ACT 11 in either case.

As ACT 11, the processor 811 increments the search count. Then, the processor 811 repeats ACT 5 and subsequent actions in the same manner as described above. When executing ACT 5 for the second time or later, the processor 811 does not acquire a new output value for the light receiving part(s) 7112 for which the output value was already within the target range and may use the previously acquired output value as the acquired output value in ACT 6 for such light receiving part(s) 7112.

Thus, the processor 811 waits for the output value of the light receiving parts 7112 to fall within an allowable range while changing the input voltage to the light emitting part 7111. In this case, if the output value is excessive with respect to the allowable target range, the processor 811 reduces the input voltage to lower light emission intensity. If the output value is too small with respect to the allowable target range, the processor 811 increases the input voltage to increase the light emission intensity. In this embodiment, as the search count increases, the amount (size) of change in the input voltage at one time decreases. With this configuration, the light emission intensity of the light emitting part 7111 is adjusted by a binary search method so that the output value approaches the allowable target range. In this way, the processor 811 controls the controller 7113 so as to change the input voltage to the light emitting part 7111 in the sequence described above during the inspection process. Thus, by executing information processing based on the determination program PRA by the processor 811, a function as a supply unit is realized by cooperation between the processor 811 and the controller 7113.

Then, if all the output values of the light receiving parts 7112 of the respective optical sensors 711-1 to 711-3 are within the target range, the processor 811 determines that the determination result in ACT 6 is YES and proceeds to ACT 12.

As ACT 12, the processor 811 closes the shutter 712. For example, the processor 811 operates the shutter solenoid 713 to move the shutter 712 from the open position to the closed position.

As ACT 13, the processor 811 stops the inspection operation. After that, the processor 811 ends the determination process. In this way, if all the output values of the respective light receiving parts 7112 of the optical sensors 711-1 to 711-3 fall within the target range, the processor 811 determines that an abnormality is not present and ends the determination process as it is.

On the other hand, if at least one of the output values of the respective light receiving parts 7112 of the optical sensors 711-1 to 711-3 does not fall within the target range even after the processor 811 repeats ACT 5 to ACT 11 up to a predetermined number of times, the processor 811 completes the search if the search count is equal to or greater than the upper limit, determines that the determination result in ACT 7 is YES and proceeds to ACT 14 in FIG. 6.

As ACT 14, the processor 811 closes the shutter 712. For example, the processor 811 operates the shutter solenoid 713 to move the shutter 712 from the open position to the closed position.

As ACT 15, the processor 811 stops the inspection operation. In the following, the output value most recently acquired (in ACT 5) before the stopping of the inspection operation in this way (in ACT 15) is referred to as a final output value.

As ACT 16, the processor 811 selects one of the optical sensors 711-1 to 711-3 as a target sensor to be checked.

As ACT 17, the processor 811 checks whether or not the input voltage being set for the target sensor is some predetermined highest value. The highest value in this context is the input voltage that would be set if ACT 9 were executed continuously when repeating a loop of ACT 5 to ACT 11 in FIG. 5, and in the case of this embodiment, this set value corresponds to "256". If the input voltage is this highest value, the processor 811 determines that the determination result is YES, and proceeds to ACT 18.

As ACT 18, the processor 811 determines that the target sensor is in a shutter abnormal state (e.g., a shutter abnormal error has occurred). If the shutter 712 is correctly in the closed position, light will not be at all incident on the light receiving part 7112 of the target sensor, so that the high output state will not be attained. Therefore, if the shutter 712 remains in the closed position despite the processor 811 controlling to open the shutter 712 in ACT 2, the output value acquired in ACT 5 for the target sensor will be neither within the target range nor in the high output state. Therefore, the processor 811 repeats ACT 10 until it can be determined in ACT 7 that the search is completed. When the search is completed, the input voltage reaches its the highest value. Accordingly, the processor 811 determines that the shutter abnormality is present, as ACT 18.

If the input voltage presently being set for the target sensor is not the highest value, the processor 811 determines that the determination result in ACT 17 is NO and proceeds to ACT 19.

As ACT 19, the processor 811 checks whether or not the target sensor is in the high input state. The high input state is a state in which the input voltage is above a target range. For example, if the input voltage for the target sensor is equal to or greater than a predetermined threshold voltage, the processor 811 determines that the target sensor is in the high input state. For example, the high voltage range and the threshold voltage may be appropriately set by the designer of the MFP 100. Then, if the processor 811 determines that the target sensor is in the high input state in ACT 19 is YES, the processor 811 proceeds to ACT 20.

As ACT 20, the processor 811 determines that the target sensor is in a staining state (stained state). The light emitting part 7111 and the light receiving part 7112 of the optical sensors 711-1 to 711-3 may be stained (partially blocked) with toner from the belt 20. If such a stain occurs, light emitted by the light emitting part 7111 and/or light reflected by the image carrying surface of the belt 20 will be blocked, and the amount of light incident on the light receiving part 7112 is reduced.

Figures 7, 8:
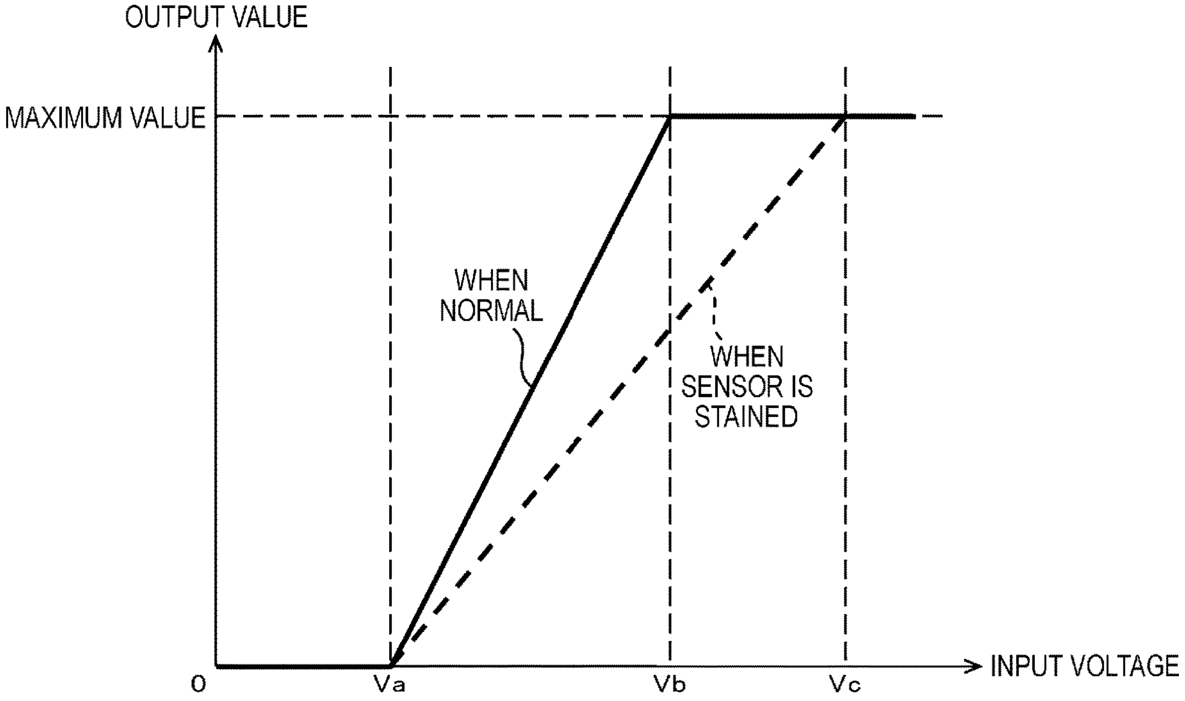
FIG. 7 is a diagram illustrating an example of characteristics of an optical sensor.
FIG. 8 is a table illustrating a result of a search operation if a scratch on a belt reaches a detection position of a target sensor when a search count value is eight.

FIG. 7 is a diagram illustrating an example of characteristics of the optical sensors 711-1 to 711-3.

In the example of FIG. 7, even if the optical sensors 711-1 to 711-3 are operating normally and the belt 20 is normal without any trouble, if the input voltage to the light emitting part 7111 is Va or less, then light at the light receiving part 7112 is insufficient to cause a response, and the sensor output value is substantially zero. Once the setting value of the input voltage exceeds Va, the output value of the light receiving part 7112 also increases in proportion to the magnitude of the input voltage. However, once the output value of the light receiving part 7112 reaches some predetermined highest value (maximum output value), the output value remains at the maximum value even if the input voltage is increased beyond the input voltage Vb.

Even if the optical sensors 711-1 to 711-3 are stained, the output value of the light receiving part 7112 still tends to increase with increases in input value for the light emitting part 711, however, the increment (slope) of the change in the output value of the light receiving part 7112 with changes in input voltage to the light emitting part 711 is reduced compared to when the optical sensors 711-1 to 711-3 are normal (non-stained). The increment change when the output value of the light receiving part 7112 increases in proportion to the magnitude of the input voltage changes depending on the degree of staining of the optical sensors 711-1 to 711-3. Thus, an input voltage Vc is required before the output value of the light receiving part 7112 reaches the highest value and input voltage Vc is larger than the input voltage Vb. However, in general, a large enough amount of toner is not usually expected to fall over a short time period such that the light incident onto the light receiving part 7112 will not usually be substantially blocked in the course of a normal usage lifetime. Thus, even with some amount of staining, the output of the light receiving part 7112 will continue to increase or decrease according to the increase or decrease of the input voltage as applied in the search operation, and the input voltage if the search operation is completed may still not reach the maximum value, but is often a relatively large value. According to such circumstances, it can be determined that the optical sensor is stained if the target sensor can still reach the high input state.

If the processor 811 cannot check that the target sensor reaches the high input state, the processor 811 determines that the determination result in ACT 19 is NO and proceeds to ACT 21.

As ACT 21, the processor 811 checks whether or not the target sensor is in an output value abnormal state. Here, an output value abnormality refers to a state in which the final output value deviates from its target range. In this first embodiment, the output value abnormality is defined as a state in which the final output value deviates from a predetermined allowable range that includes the target range but is a range somewhat wider than the target range. For example, if the final output value of the target sensor is less than the lower limit of the allowable range, or if the final output value of the target sensor is larger than the upper limit of the allowable range, the processor 811 determines that the output value abnormality is present. For example, the allowable range may be appropriately determined by the designer of the MFP 100. Then, if an output value abnormality is present, the processor 811 determines that the determination result is YES and proceeds to ACT 22.

As ACT 22, the processor 811 determines that the target sensor is in a belt abnormal state. In this context, a belt abnormality (or a belt abnormal state) occurs when the image carrying surface of the belt 20 is somehow marred, scratched, or otherwise damaged such that the reflection of light off the belt 20 becomes abnormal. For example, if the toner cannot be (or is not) completely removed due to the malfunction of the belt cleaner 29 and thus remains on the image carrying surface of the belt 20, the reflection of light from the image carrying surface will be reduced by the presence of the toner. If a scratch is generated on the image carrying surface, the amount of reflection can be reduced by the presence of the scratch. In these situations, the processor 811 determines that a belt abnormality of some sort is present.

FIG. 8 is a table illustrating a result of a search operation if the scratch on the belt 20 reaches a detection position of the target sensor when the search count reaches "8".

FIG. 8 shows an example for which the maximum output value of the light receiving part 7112 is "5.20".

If there is no obstacle on the belt 20, the output value, which should be "3.98", which is within the target range of this example, is increased by increasing the input voltage when the search count is "8, whereas the output value instead drops to "2.00" due to the influence of the scratch. Consequently, since the final output value is out of the allowable range defined as "3.00" to "5.00" in this example, the processor 811 determines that the output value abnormality is present in ACT 21, and determines that the belt is abnormal.

FIG. 9 is a table illustrating an example of the result of the search operation when the scratch of the belt 20 reaches the detection position of the target sensor when the search count is "1".

If there is no obstacle on the belt 20, the output value when the search count is "1" should be "5.20" as represented in FIG. 8, but the output value drops to "2.00" due to the influence of the scratch at this time. Consequently, the set value of the input voltage if the search count is "2" is increased to "192". In this case, since the scratch already passes the detection position of the target sensor, the output value when the set value of the input voltage is "192" is now "5.20," which is the maximum value. When the search count changes from "3" to "8", the input voltage is sequentially reduced, but the output value is never not less than "5.20". Consequently, since the final output value of the processor 811 is out of the allowable range defined as "3.00" to "5.00" in this example, the processor 811 determines that the output value abnormality is present in ACT 21 and determines that the belt is abnormal.

If the output value is not acquired at the timing when the scratch reaches the detection position of the target sensor, or when the output value is dropped due to the influence of the scratch at a timing different from the timing described above, the processor 811 may not always determine that the determination result in ACT 21 is YES. However, it suffices if the belt abnormality can be detected as described above if the determination process is performed a plurality of times.

If the processor 811 determines that the determination result in ACT 21 is NO, the processor 811 proceeds to ACT 23.

As ACT 23, the processor 811 determines that the target sensor is normal. After that, the processor 811 proceeds to ACT 24. The processor 811 also proceeds to ACT 24 if the processor 811 completes ACT 18, ACT 20 or ACT 22.

As ACT 24, the processor 811 checks whether or not any of the optical sensors 711-1 to 711-3 has not been selected as the target sensor. Then, if an unselected optical sensor remains, the processor 811 determines that the determination result is YES, and repeats ACT 16 and subsequent actions in the same manner as described above. If the processor 811 executes ACT 16 for the second time or later, the processor 811 selects an optical sensor as the target sensor that has not been selected yet while repeating a loop of ACT 16 to ACT 24. That is, the processor 811 executes the processing of ACT 16 to ACT 24 for each of the optical sensors 711-1 to 711-3, while eventually selecting each of the optical sensors 711-1 to 711-3 as the target sensor. Then, once the processor 811 returns to ACT 24 after all of the optical sensors 711-1 to 711-3 have been selected as the target sensors, since an unselected optical sensor is not present anymore, the processor 811 determines that the determination result is NO and proceeds to ACT 25.

As ACT 25, the processor 811 checks whether or an abnormal sensor is present among the optical sensors 711-1 to 711-3. If any one of ACT 18, ACT 20 and ACT 22 was executed even once, the processor 811 determines that an abnormal sensor is present and the determination result in ACT 25 is YES, and proceeds to ACT 26.

As ACT 26, the processor 811 requests the system controller 104 to notify (indicate) that an abnormality is present. Then, the processor 811 ends the determination process. In response to the request, the system controller 104 performs control for performing a predetermined notification operation such as displaying a predetermined screen for a corresponding notification on a display device provided in the operation panel 105, for example. When requesting the notification of the abnormality, the processor 811 may notify the system controller 104 of whether an error state was particularly determined to be a shutter abnormality error (shutter abnormal error), a sensor staining error, or a belt abnormality error (belt abnormal error). In this case, the system controller 104 may display the determination of the cause of the abnormality on the screen for notifying the abnormality.

In this way, the processor 811 executes processing for requesting execution of the notification operation as processing for notifying the user of an abnormality. Then, the notification operation is executed by the cooperation between the system controller 104 and the operation panel 105 in response to this request. That is, by executing information processing based on the determination program PRA by the processor 811, the processor 811 functions as a processing unit. The function as a notification unit is realized by the cooperation between the system controller 104 and the operation panel 105.

If ACT 18, ACT 20, and ACT 22 are not executed by the processor 811, the processor 811 determines that an abnormal sensor is not present and the determination result in ACT 25 is NO, and ends the determination process without executing ACT 26.

As described above, the MFP 100 determines whether the abnormality related to an inspection using the image quality sensor unit 71 is a shutter abnormality, a sensor stain, or a belt abnormality based on the set value of the input voltage or the final output value if the search operation was completed. Thus, by taking appropriate measures based on the error type, a state in which the formation state of the image cannot be detected correctly can be prevented from being left unaddressed.

Second Embodiment

In general, the MFP 200 of the second embodiment is similar to MFP 100 of the first embodiment, however certain aspects to be described below are differ. Those aspects which are the same in each embodiment are assigned the same reference symbols.

Figure 10:
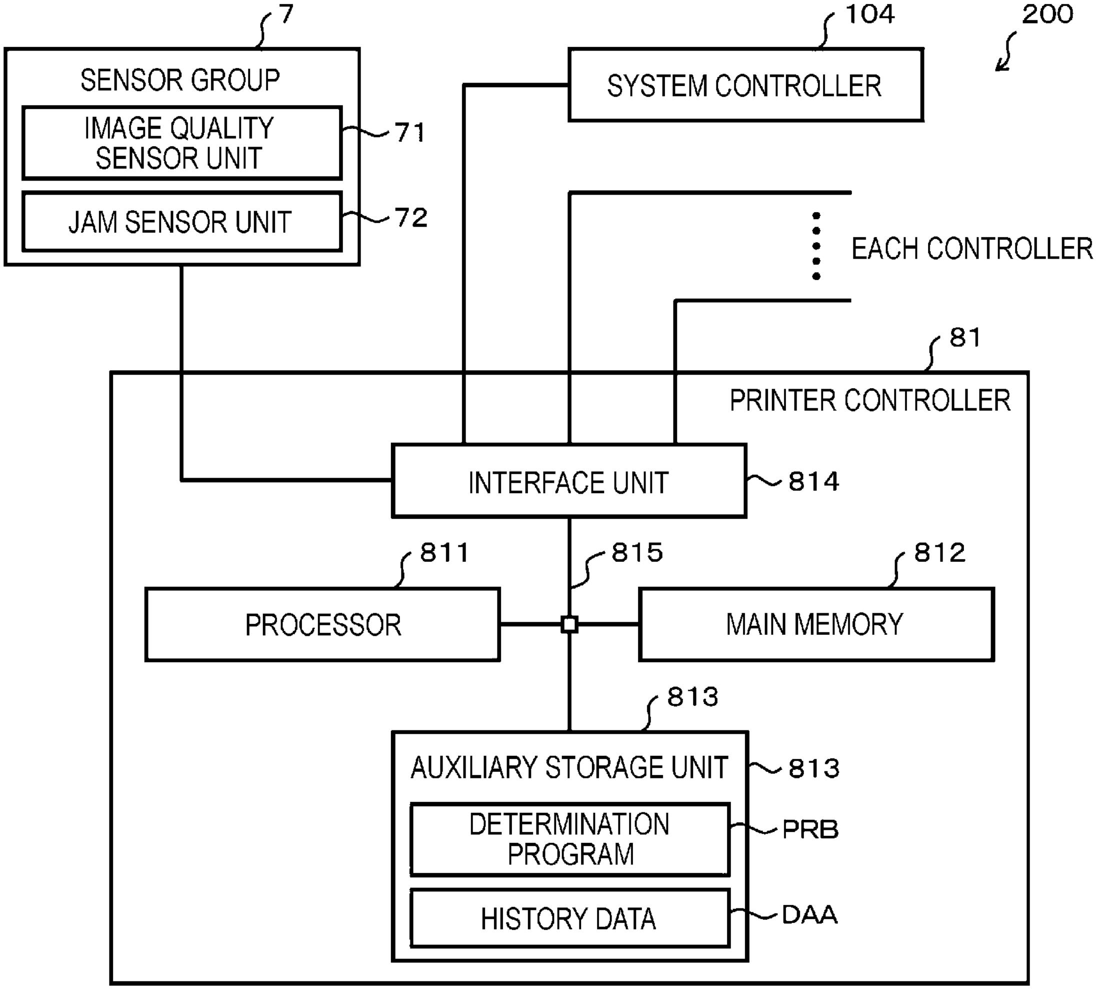
FIG. 10 is a block diagram of an MFP according to a second embodiment.

FIG. 10 is a block diagram of an MFP 200 according to the second embodiment.

FIG. 10 illustrates only those aspects of the configuration of the MFP 200 related to differences in the MFP 200 from the MFP 100. The aspects of the MFP 200 not illustrated in FIG. 10 may be assumed to be the same as illustrated in FIG. 1 to FIG. 3 for MFP 100.

In particular, among the components illustrated in FIG. 10, those that are substantially similar to those illustrated in FIG. 4 are denoted by the same reference numerals, and additional description thereof may be omitted.

The auxiliary storage unit 813 stores a determination program PRB in place of the determination program PRA, and also stores history data DAA. The determination program PRB is an information processing program that provides instructions for a determination process that is partially different from the determination program PRA. The history data DAA is data obtained from the results of a search process performed in the past (a prior search process). For example, the history data DAA is data that represents the setting value of the input voltage after one search process was completed along with the corresponding final output value. Such data may be provided in time-series order for previous inspections and/or search processes. In this second embodiment, data corresponding to that illustrated in FIG. 8 that is correlated to time information that indicates when the corresponding search process was performed is used as the history data DAA. For example, the various contents included in the history data DAA may be appropriately determined by the designer of the MFP 200. The auxiliary storage unit 813 is an example of a storage unit that may store the input voltage when a search process is completed for a plurality of times of inspection.

In the printer controller 81, the processor 811 starts executing the determination process based on the determination program PRB when the predetermined execution timing is reached as in the first embodiment.

Figure 11:
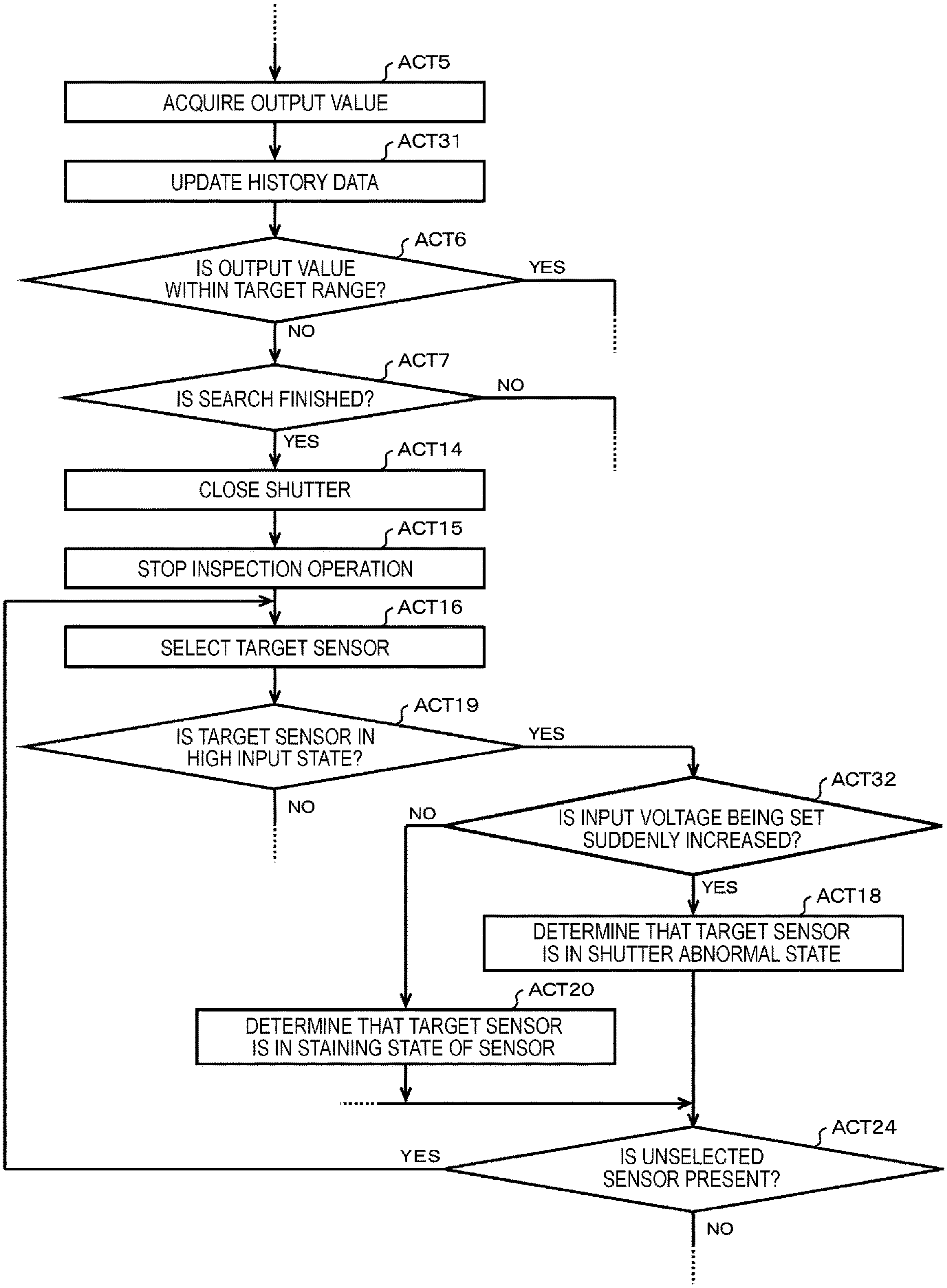
FIG. 11 is a flowchart of a determination process in a second embodiment.

FIG. 11 is a flowchart illustrating a processing procedure of the processor 811 in the determination process.

FIG. 11 is primarily provided to illustrate the differences in the determination process of this example as compared to example of the first embodiment as such was illustrated in FIG. 5 and FIG. 6. Thus, some overlapping processing has been omitted from the illustration in FIG. 11, and when the same processing is included in FIG. 11, such is denoted by the same reference numerals as used in previously described figures.

The processor 811 performs ACT 1 to ACT 5 in the same manner as in the first embodiment. Then, if the output value is acquired in ACT 5, the processor 811 proceeds to ACT 31 as depicted in FIG. 11.

As ACT 31, the processor 811 updates the history data DAA. That is, the processor 811 adds the output value acquired in ACT 5 and the set value of the input voltage at the present time point to the history data DAA. After that, the processor 811 executes ACT 6 and subsequent actions in the same manner as in the first embodiment. Then, after the processor 811 completes executing up to ACT 16 in the same manner as in the first embodiment, the processor 811 proceeds to ACT 19 without executing ACT 17. Furthermore, if the processor 811 determines that the high input state is present and the determination result in ACT 19 is YES, the processor 811 proceeds to ACT 32.

As ACT 32, the processor 811 checks whether the input voltage being set for the target sensor is suddenly increased compared to the input voltage after the past search operation is completed. For example, if the value obtained by subtracting the input voltage of the previous search operation from the input voltage being set for the target sensor is equal to or greater than a predetermined threshold value, the processor 811 determines that the input voltage being set is suddenly increased. In addition to the above example, another rule for determining a sudden increase may be appropriately selected by the designer of the MFP 200 or different conditions may be used depending on the previous value of the input voltage found in the search operation. However, whenever the processor 811 determines that the input voltage is suddenly increased and the determination result is YES, the processor 811 proceeds to ACT 18 and determines that the shutter abnormal error is present.

If processor 811 determines that the determination result in ACT 32 is NO, the processor 811 proceeds to ACT 20, and indicates that sensor staining is present.

In the MFP 200, the input voltage after the search operation is completed does not increase significantly if the shutter 712 is operating normally, whereas the input voltage after the search operation is completed will reach the highest value if the shutter 712 does not move from its closed position. That is, the shutter 712 was apparently in a normal state during the previous search operation, but did not operate properly during the current search operation and thus has changed to an abnormal state. In such a case, the input power after the search operation is completed will be suddenly increased (as compared to a previous search operation). Therefore, the processor 811 determines that a shutter abnormality is present as ACT 18.

On the other hand, in general, the staining of the optical sensors 711-1 to 711-3 gradually progresses as described in the first embodiment. Thus, if, after the search operations are completed, the input voltage has gradually increased over time (corresponding to the number completed searches), the processor 811 determines that a sensor abnormality (instead of a shutter abnormality) is present as ACT 20.

As described above, the MFP 200 determines abnormalities related to the inspection using the image quality sensor unit 71, such as a shutter abnormality, a sensor staining, or a belt abnormality, based on the values of the input voltage or final output value after the search operation is completed. Thus, by taking appropriate measures based on the result of this determination, the state in which the formation state of the image cannot be detected correctly can be prevented from being left unaddressed. In this way, by executing information processing based on the determination program PRA by the processor 811, the processor 811 functions as the determination unit.

Embodiments can be modified in various ways as follows.

First Modification

Figure 12:
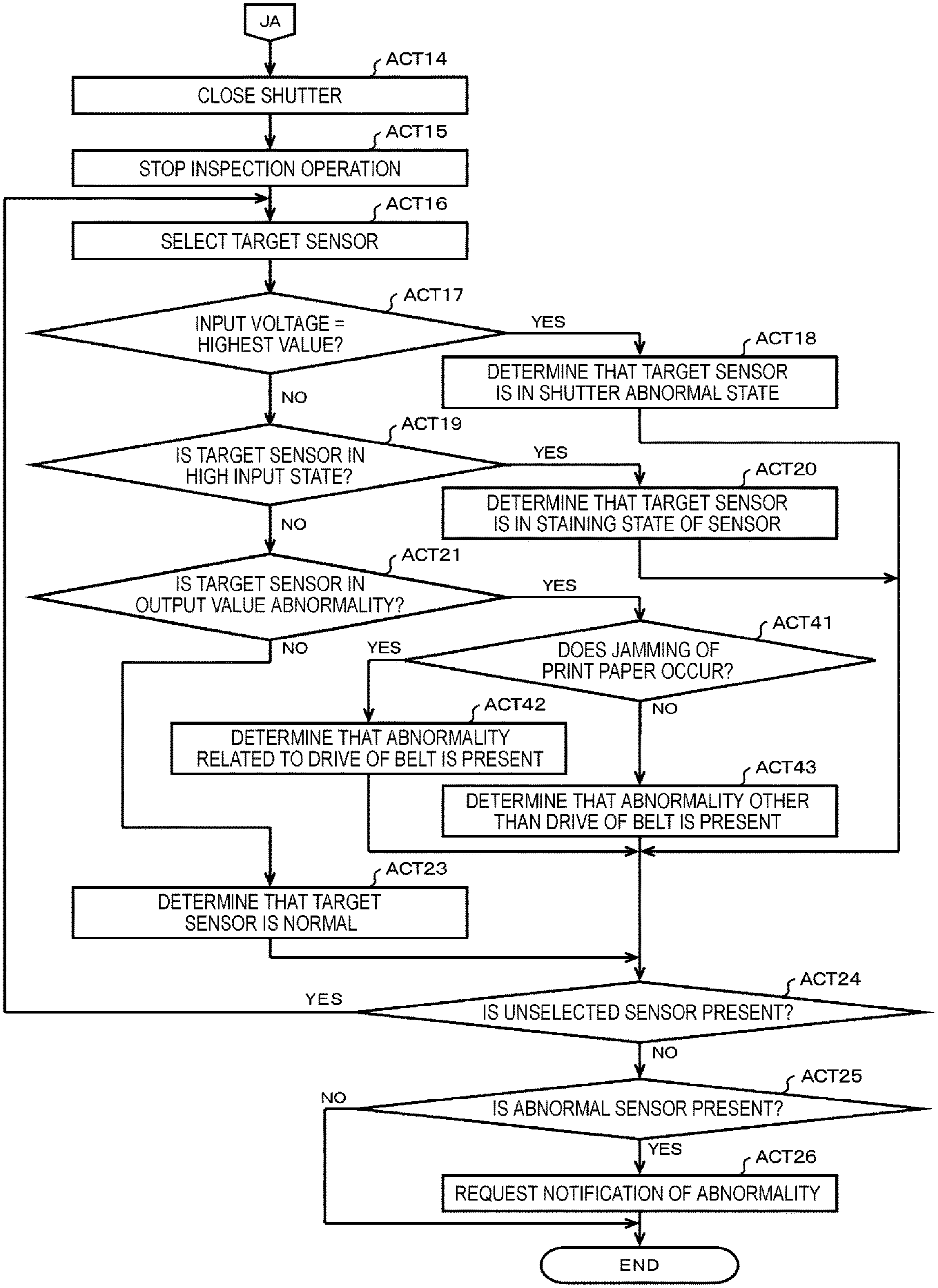
FIG. 12 is a flowchart illustrating a modification of a determination process.

FIG. 12 is a flowchart illustrating a modification of the processing procedure of the processor 811 in the determination process. FIG. 12 illustrates differences from the determination process of the first embodiment (as illustrated in FIG. 6), and the overlapping processing is denoted by the same reference numerals.

If the processor 811 determines that the determination result in ACT 21 is YES by checking that the output value is abnormal, the processor 811 proceeds to ACT 41.

As ACT 41, the processor 811 checks whether or not a jamming of printer paper occurs. For example, the processor 811 determines that jamming occurs if the number of times jamming is detected by the jam sensor unit 72 in an image forming operation performed in some predetermined period before the starting of the current determination process is equal to or greater than a predetermined threshold value. For example, the check period and threshold value described above may be appropriately set by, for example, the designer of the MFP 100. As an example, it is assumed that the check period is from the end of the previous determination process to the start of the determination process currently being performed. As another example, the check period be based on some predetermined number of images (printed sheets or jobs) being performed before the start of the current determination process. The threshold value can be arbitrarily selected. If the processor 811 determines that jamming occurs and the determination result is YES, the processor 811 proceeds to ACT 42. If jamming does not occur, the processor 811 determines that the determination result in ACT 41 is NO, the processor 811 proceeds to ACT 43.

As ACT 42, the processor 811 determines that an abnormality related to the driving of the belt 20 is present. The abnormality may be related to poor cleaning, a tearing of the belt 20, abnormality in the drive mechanism of the belt 20, or the like.

As ACT 43, the processor 811 determines that an abnormality other than the drive of the belt 20 is present. The abnormality may include damage to the surface of the belt 20, toner fogging, and the like.

Thus, if the output value reaches an abnormal state according to the result of the search operation but the sensor is not in a high input state after the search operation is completed, the processor 811 determines that an abnormality related to the belt 20 occurs. Moreover, the processor 811 determines whether or not the abnormality related to the belt 20 is related to the drive of the belt 20 according to an occurrence state of the jamming of the printer paper in an actual image forming operation. Incidentally, the fact that the jamming of printer paper is likely to occur in image formation performed in a situation where toner that cannot be completely removed due to a malfunction of the belt cleaner 29 remains on the image carrying surface is known.

This first modification can be applied to the MFP 200 as well.

Second Modification

Figure 13:
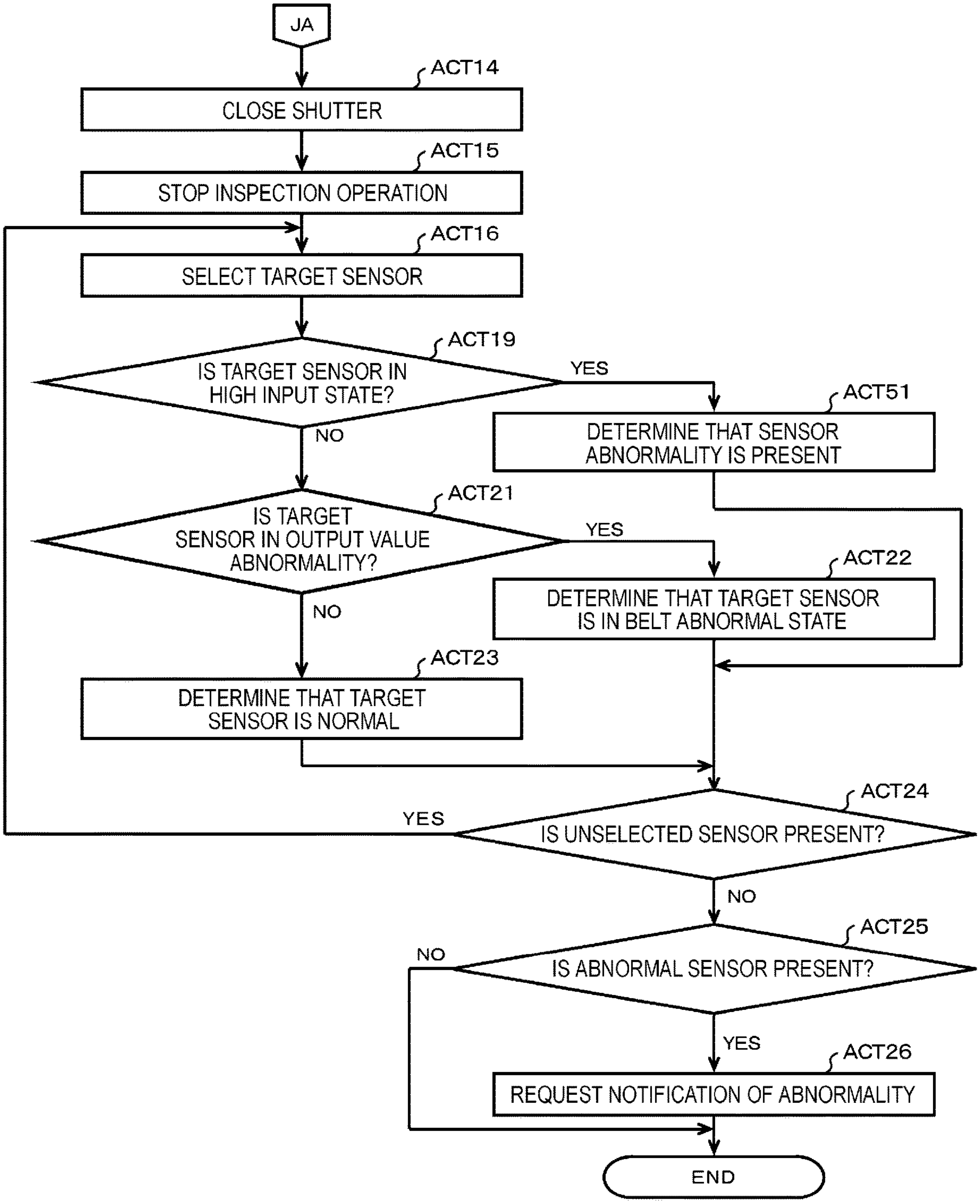
FIG. 13 is a flowchart illustrating another modification of a determination process.

FIG. 13 is a flowchart illustrating a modification of the processing procedure of the processor 811 in a determination process.

FIG. 13 primarily illustrates a difference from the determination process of the first embodiment illustrated in FIG. 6, and the overlapping processing is denoted by the same reference numeral.

After completing ACT 16, the processor 811 proceeds to ACT 19 without executing ACT 17 (as depicted in FIG. 6). Then, if the processor 811 determines that the determination result in ACT 19 is YES, the processor 811 proceeds to ACT 51.

As ACT 51, the processor 811 determines that a sensor abnormality such as a sensor staining or shutter abnormality is present.

That is, in this second modification, the processor 811 determines that a sensor abnormality is present without attempting to distinguish between sensor staining and shutter abnormality.

Other Modifications

In the first embodiment, the first high voltage range is on the high voltage side including the highest value of the variable range of the input voltage. A second high voltage range is on the high voltage side but lower than the first high voltage range in the variable range. Then, the processor 811 may determine that the determination result in ACT 17 is YES if a first high input state is present, and may determine that the determination result in ACT 19 is YES if a second high input state is present.

In the first embodiment, ACT 17 and ACT 18 in FIG. 6 may be omitted, and the processor 811 may determine in ACT 20 that an abnormality of the target sensor is present. In some examples, the image quality sensor unit 71 may not include the shutter 712 and the shutter solenoid 713. In this case, carrying out this modification is preferable.

In the first embodiment, ACT 21 to ACT 23 in FIG. 6 may be omitted.

In both the first embodiment and the second embodiment, either the determination of the abnormality of the image quality sensor unit 71 or the determination of the abnormality of the belt 20 may be performed.

The determination of the abnormality of the image quality sensor unit 71 in the first embodiment and the determination of the abnormality of the belt 20 in the second embodiment may be executed in combination. That is, the processor 811 may execute ACT 33 to ACT 35 in FIG. 11 instead of ACT 21 to ACT 23 in FIG. 6, for example.

The determination of the abnormality of the belt 20 in the first embodiment and the determination of the abnormality of the image quality sensor unit 71 in the second embodiment may be executed in combination. That is, the processor 811 may execute ACT 32, ACT 18 and ACT 20 in FIG. 11 instead of ACT 17 to ACT 20 in FIG. 6, for example.

The search operation may be performed by a method other than the described binary search method, such as a linear search, a hash search, or an estimation from a calibration curve after measuring two or more points.

The abnormality may be determined in consideration of the input voltage and the output value in the middle of the search.

The abnormality may be determined in consideration of a state of change in the input voltage or a state of change in the output value during the search.

The notification of the abnormality may be performed as a report issued to a predetermined reporting destination. For example, an e-mail for notifying an abnormality can be transmitted to a predetermined e-mail address. For example, in response to a notification from MFP 100 (or MFP 200) to any information processing terminal such as a smartphone or a personal computer, the information processing terminal performs an operation for notifying an abnormality.

The processor 811 may also perform an operation for indicating that the MFP is normal if no abnormality is detected in the inspection operation.

In general, any image forming apparatus may adopt aspects of the first and/or second embodiments. Various apparatuses other than an MFP, such as a copying machine, a printer, or a facsimile machine may beneficially adopt such aspects.

The number of image forming units is not limited to four, and an image forming apparatus including at least one image forming unit may be used.

An image forming apparatus that forms an image by a method different from the electrophotographic method, such as an inkjet method may be used.

Each function realized by the processor 811 through information processing in each of the embodiments described above can also be partially or entirely realized by hardware, which executes information processing that is not based on a program, such as a logic circuit. Each of the functions described above can be realized by combining software control with the hardware such as the logic circuit described above.

While certain embodiments have been described, these embodiments have been presented by way of example only, and are not intended to limit the scope of the inventions. Indeed, the novel apparatus and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:

an image forming unit to form an image on a sheet;

a sensor including a light emitting part with a light emission intensity that changes according to an input voltage level and a light receiving part that outputs an output value that changes according to the amount of incident light, the sensor configured to detect a toner density of the image formed by the image forming unit;

a power supply unit to supply power to the light emitting part and change the input voltage level of the power supplied to light emitting part in a predetermined sequence until an end condition is satisfied during an inspection operation; and a controller configured to make an abnormality determination based on a state of the sensor when the end condition is satisfied during the inspection operation, wherein the controller is configured to determine whether or not the state of the sensor is abnormal based on the input voltage level when the end condition is satisfied.

2. The image forming apparatus according to claim 1, wherein the controller is configured to determine that the sensor is abnormal if the input voltage level when the end condition is satisfied is within a high voltage range.

3. The image forming apparatus according to claim 1, wherein the sensor further includes a shutter that blocks light from entering the light receiving part when closed, and the controller is further configured to:

determine that a shutter abnormality occurs if the input voltage level when the end condition is satisfied is within a first high voltage range, and determine that a stain abnormality occurs if the input voltage level when the end condition is satisfied is within a second high voltage range that is below the first high voltage range.

4. The image forming apparatus according to claim 1, further comprising:

a storage unit configured to store the input voltage level when the end condition is satisfied in a previous inspection operation, wherein the sensor further includes a shutter that blocks light from entering the light receiving part when closed state, and the controller is further configured to:

determine that a shutter abnormality occurs if the input voltage level for the previous inspection operation stored in the storage unit is substantially below the input voltage level for the inspection operation, and determine that a stain abnormality occurs if the input voltage level for the previous inspection operation stored in the storage unit is not substantially below the input voltage level for the inspection operation.

5. The image forming apparatus according to claim 1, wherein the image forming unit includes a transfer belt on which a toner image is formed before transfer to the sheet, the sensor is positioned to detect the toner density of the image formed by the image forming unit by inspection of the toner image on the transfer belt before transfer to the sheet, and the controller is further configured to determine whether or not the transfer belt is abnormal based on the output value from the light receiving part when the end condition is satisfied in the inspection operation.

6. The image forming apparatus according to claim 5, wherein the controller is further configured to determine that the transfer belt is abnormal when the output value from the light receiving part is outside a output target range and the input voltage level is within an input target range when the end condition is satisfied during the inspection operation.

7. The image forming apparatus according to claim 5, wherein controller is further configured to determine that an abnormality related to driving of the transfer belt is present when the output value from the light receiving part is outside of a target range but a sheet jam condition has been detected.

8. The image forming apparatus according to claim 1, wherein the controller is further configured to output a notification for notifying a user that an abnormality has been detected.

9. The image forming apparatus according to claim 8, wherein the notification indicates an abnormality type as determined by the controller.

10. An image forming apparatus, comprising:

a transfer belt;

an image forming unit configured to form a toner image on the transfer belt;

a transfer roller at which the toner image on the transfer belt is transferred to a sheet;

an optical sensor configured to detect a density of the toner image on the transfer belt at position between the image forming unit and the transfer roller; and a controller connected to the optical sensor and configured to:

control an input voltage supplied to a light emitting element of the optical sensor during an inspection operation, detect an output voltage supplied from a light receiving element of the optical sensor during the inspection operation, and make an abnormality determination based on values of the input voltage and the output voltage when an end condition of the inspection operation is satisfied, wherein the controller is configured to determine whether or not the state of the optical sensor is abnormal based on the input voltage when the end condition is satisfied.

11. The image forming apparatus according to claim 10, further comprising:

a shutter that blocks light from entering the light receiving element when closed, and the controller is configured to:

determine that a shutter abnormality occurs if the input voltage when the end condition is satisfied is within a first high voltage range, and determine that a stain abnormality occurs if the input voltage when the end condition is satisfied is within a second high voltage range that is below the first high voltage range.

12. The image forming apparatus according to claim 10, wherein the abnormality determination is additionally based on a comparison of the values of the input voltage and the output voltage when the end condition of the inspection operation is satisfied to values of the input voltage and the output voltage when the end condition was satisfied in previous inspection operations.

13. The image forming apparatus according to claim 10, wherein the controller is further configured to determine that the transfer belt is abnormal when the output voltage is outside a output target range and the input voltage is within an input target range when the end condition is satisfied during the inspection operation.

14. The image forming apparatus according to claim 10, wherein controller is further configured to determine that an abnormality related to driving of the transfer belt is present when the output voltage is outside of a target range and a sheet jam condition has been detected.

15. The image forming apparatus according to claim 10, wherein the controller is further configured to output a notification for notifying a user that an abnormality has been detected in the inspection operation.

16. The image forming apparatus according to claim 15, wherein the notification indicates an abnormality type as determined by the controller.

17. An image forming apparatus, comprising:

an image forming unit to form an image on a sheet;

a sensor including a light emitting part with a light emission intensity that changes according to an input voltage level and a light receiving part that outputs an output value that changes according to the amount of incident light, the sensor configured to detect a toner density of the image formed by the image forming unit;

a power supply unit to supply power to the light emitting part and change the input voltage level of the power supplied to light emitting part in a predetermined sequence until an end condition is satisfied during an inspection operation; and a controller configured to make an abnormality determination based on a state of the sensor when the end condition is satisfied during the inspection operation, wherein the image forming unit includes a transfer belt on which a toner image is formed before transfer to the sheet, the sensor is positioned to detect the toner density of the image formed by the image forming unit by inspection of the toner image on the transfer belt before transfer to the sheet, the controller is further configured to determine whether or not the transfer belt is abnormal based on the output value from the light receiving part when the end condition is satisfied in the inspection operation, and the controller is further configured to determine that the transfer belt is abnormal when the output value from the light receiving part is outside a output target range and the input voltage level is within an input target range when the end condition is satisfied during the inspection operation.

18. The image forming apparatus according to claim 17, wherein controller is further configured to determine that an abnormality related to driving of the transfer belt is present when the output value from the light receiving part is outside of a target range but a sheet jam condition has been detected.

19. The image forming apparatus according to claim 17, wherein the controller is further configured to output a notification for notifying a user that an abnormality has been detected.

20. The image forming apparatus according to claim 17, further comprising:

a storage unit configured to store the input voltage level when the end condition is satisfied in a previous inspection operation, wherein the sensor further includes a shutter that blocks light from entering the light receiving part when closed state, and the controller is further configured to:

determine that a shutter abnormality occurs if the input voltage level for the previous inspection operation stored in the storage unit is substantially below the input voltage level for the inspection operation, and determine that a stain abnormality occurs if the input voltage level for the previous inspection operation stored in the storage unit is not substantially below the input voltage level for the inspection operation.

* * * * *